(12) United States Patent
Brown et al.

(10) Patent No.: US 9,037,845 B2
(45) Date of Patent: *May 19, 2015

(54) SYSTEM AND METHOD FOR OBTAINING CERTIFICATE STATUS OF SUBKEYS

(71) Applicant: BlackBerry Limited, Waterloo (CA)

(72) Inventors: Michael Kenneth Brown, Fergus (CA); Michael Grant Kirkup, Waterloo (CA); Herbert Anthony Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,054

(22) Filed: Apr. 19, 2013

(65) Prior Publication Data
US 2013/0232334 A1 Sep. 5, 2013

Related U.S. Application Data

(63) Continuation of application No. 12/842,133, filed on Jul. 23, 2010, now Pat. No. 8,442,234, which is a continuation of application No. 10/992,868, filed on Nov. 19, 2004, now Pat. No. 7,787,626.

(60) Provisional application No. 60/567,162, filed on Apr. 30, 2004.

(51) Int. Cl.
*H04L 9/00* (2006.01)
*H04L 29/06* (2006.01)
(Continued)

(52) U.S. Cl.
CPC ............ *H04L 63/062* (2013.01); *H04L 9/0891* (2013.01); *H04L 12/2854* (2013.01); *H04L 63/06* (2013.01); *H04L 63/068* (2013.01); *H04L 2209/80* (2013.01)

(58) Field of Classification Search
CPC ... H04L 9/0891; H04L 12/2854; H04L 63/06; H04L 63/062; H04L 63/068; H04L 2209/80
USPC .............. 380/44–45, 273, 277, 279; 713/156, 713/158, 176, 153
See application file for complete search history.

(56) References Cited

U.S. PATENT DOCUMENTS

| 5,515,439 | A | 5/1996 | Bantz et al. |
| 6,496,932 | B1 | 12/2002 | Trieger |

(Continued)

FOREIGN PATENT DOCUMENTS

| CA | 2564334 | 11/2005 |
| CA | 2476919 | 12/2007 |

(Continued)

OTHER PUBLICATIONS

European Response for European Patent Application No. 04821932.3, dated Apr. 24, 2008.

(Continued)

*Primary Examiner* — Baotran N To
(74) *Attorney, Agent, or Firm* — Integral Intellectual Property Inc.; Miriam Paton; Amy Scouten

(57) ABSTRACT

Systems and methods for updating status of digital certificate subkeys. A request is made to a key server to verify if a given key is revoked. If it is not, then the key with its subkeys is acquired from the key server. If one or more subkeys or signatures of the subkeys are different in the acquired key, then the key is replaced.

22 Claims, 6 Drawing Sheets

(51) Int. Cl.
*H04L 9/08* (2006.01)
*H04L 12/28* (2006.01)

(56) References Cited

U.S. PATENT DOCUMENTS

| | | | |
|---|---|---|---|
| 6,560,651 B2 | 5/2003 | Katz et al. | |
| 6,738,907 B1 | 5/2004 | Carter | |
| 6,813,356 B2 | 11/2004 | Kuvaja et al. | |
| 6,829,358 B2 | 12/2004 | Jiang | |
| 6,853,729 B1 | 2/2005 | Mizikovsky | |
| 6,941,327 B2 | 9/2005 | Kim et al. | |
| 7,448,080 B2 | 11/2008 | Karjala et al. | |
| 7,506,164 B2 | 3/2009 | Adams et al. | |
| 7,787,626 B2 * | 8/2010 | Brown et al. | 380/273 |
| 7,984,488 B2 | 7/2011 | Cross et al. | |
| 8,023,656 B2 | 9/2011 | Adams et al. | |
| 8,135,951 B2 | 3/2012 | Adams et al. | |
| 8,442,234 B2 | 5/2013 | Brown et al. | |
| 2003/0021418 A1 | 1/2003 | Arakawa et al. | |
| 2003/0142826 A1* | 7/2003 | Asano | 380/277 |
| 2003/0196080 A1* | 10/2003 | Karman | 713/150 |
| 2004/0236632 A1 | 11/2004 | Maritzen et al. | |
| 2005/0021969 A1* | 1/2005 | Williams et al. | 713/176 |
| 2005/0050004 A1 | 3/2005 | Sheu et al. | |
| 2005/0210267 A1 | 9/2005 | Sugano et al. | |
| 2005/0244009 A1 | 11/2005 | Brown et al. | |
| 2005/0257072 A1 | 11/2005 | Cross et al. | |
| 2009/0217044 A1 | 8/2009 | Adams et al. | |
| 2010/0284536 A1 | 11/2010 | Brown et al. | |
| 2011/0299687 A1 | 12/2011 | Adams et al. | |

FOREIGN PATENT DOCUMENTS

| | | |
|---|---|---|
| EP | 1745588 | 4/2009 |
| WO | 03007570 A1 | 1/2003 |

OTHER PUBLICATIONS

European Communication pursuant to Article 96(2) EPC for European Patent Application No. 04821932.3, dated Oct. 16, 2007.
European Decision to grant a European patent pursuant to Article 97(1) EPC for European Patent Application No. 04821932.3, dated Mar. 12, 2009.
Canadian Notice of Allowance for Canadian Patent Application No. 2,564,334, dated Jun. 17, 2011.
Canadian Office Action for Canadian Patent Application No. 2,564,334, dated Feb. 1, 2011.
Canadian Office Action for Canadian Patent Application No. 2,564,334, dated Apr. 7, 2010.
Birgit Borcherding et al., "Efficient and Trustworthy Key Distribution in Webs of Trust", Computers & Security, Elsevier Science Publishers, Amsterdam, NL, vol. 17, No. 5., 1998, p. 447-454, XP004132883, ISSN: 0167-4048.
Coperland et al., "The GNU Privacy Handbook", published in 1999, pp. 1-39.
International Search Report for International Patent Application No. PCT/CA2004/001998, dated Mar. 15, 2005.
Rolf Haenni, "Web of Trust: Applying Probabilistic Argumentation to Public-Key Cryptography", ECSQARU 2003, 2003, p. 243-254, XP019001386.
European Supplementary European Search Report for European Patent Application No. 04821932, dated Jul. 3, 2007.
William Stallings, "The PGP Web of Trust: How to Certify Public Keys Without a Central Authority", Byte, McGraw-Hill Inc., Peterborough, NH, US, vol. 20, No. 2, Feb. 1, 1995, p. 161-162.
Co-pending U.S. Appl. No. 13/211,635, "Automated Key Management System and Method", filed Aug. 17, 2011.
United States Amendment for co-pending U.S. Appl. No. 13/211,635, dated Apr. 12, 2013.
United States Non-Final Office Action for co-pending U.S. Appl. No. 13/211,635, dated Dec. 13, 2012.
Prosecution Documents for U.S. Appl. No. 10/992,868, issued to U.S. Patent No. 7,787,626 on Aug. 31, 2010.
Prosecution Documents for U.S. Appl. No. 12/842,133, issued to U.S. Patent No. 8,442,234 on May 14, 2013.
Office Action. Canadian Patent Application No. 2,762,119. Dated: Nov. 29, 2013.
Prosecution Documents for U.S. Appl. No. 10/913,499, issued to U.S. Patent No. 7,506,164 on Mar. 17, 2009.
Prosecution Documents for U.S. Appl. No. 12/350,452, issued to U.S. Patent No. 8,135,951 on Mar. 13, 2012.
Prosecution Documents for U.S. Appl. No. 12/404,749, issued to U.S. Patent No. 8,023,656 on Sep. 20, 2011.
Terminal Disclaimer. U.S. Appl. No. 13/211,635. Dated: Apr. 12, 2013.
Office Action. U.S. Appl. No. 13/211,635. Dated: Jun. 28, 2013.
Notice of Abandonment. U.S. Appl. No. 13/211,635. Dated: Jan. 10, 2014.

* cited by examiner

SYSTEM AND METHOD FOR OBTAINING CERTIFICATE STATUS OF SUBKEYS

CROSS-REFERENCE TO RELATED APPLICATIONS

This application is a continuation of U.S. patent application Ser. No. 12/842,133, filed on Jul. 23, 2010, which issued to patent as U.S. Pat. No. 8,442,234, which is a continuation of U.S. patent application Ser. No. 10/992,868, filed on Nov. 19, 2004, which issued to patent as U.S. Pat. No. 7,787,626, which claims the benefit of U.S. Provisional Patent Application No. 60/567,162, filed on Apr. 30, 2004. The entire contents of U.S. patent application Ser. No. 12/842,133, U.S. patent application Ser. No. 10/992,868 and U.S. Provisional Patent Application No. 60/567,162 are hereby incorporated by reference.

TECHNICAL FIELD

This document relates generally to the field of communications, and in particular to obtaining certificate status of subkeys on computing devices.

BACKGROUND

Many security systems rely on digital certificates or "keys" for encryption and authentication of a message. The terms "key," "main key," "certificate," and "digital certificate" are used interchangeably throughout this document and can mean a digital credential which includes a public key, for encrypting information directed to the user of the key and information for authenticating the user.

Some security systems, such as Pretty Good Privacy (PGP), do not implement a centralized authority (which keeps the most up to date status of all keys on that system, and distributes certificate revocation lists, indicating which certificates have been revoked). Instead, PGP implements "a web of trust," a method where other entities, other than a centralized authority, authenticate the keys by "signing" them. Other users may or may not consider a key authentic depending on the combination of entities which signed a given key.

PGP allows keys to be stored on key servers. The owner of a key may change the status of his key on a server, for example, the owner may revoke the key. Also other users may change the status of the key by signing it or removing their signature. A user on such system who has obtained a key of another user from the server for the purposes of encryption and authentication, has to manually download and verify the key to determine that it has not been revoked by the owner and that it can still be trusted based on combination of signatures associated with it.

SUMMARY

In accordance with the teachings provided herein, systems and methods for operation upon data processing devices are provided in order to overcome one or more of the aforementioned disadvantages or other disadvantages concerning the handling of digital keys processing. For example, a system and method can be configured to automatically acquire keys, which are already on the device, from a key server, verify their status, and update the key on this or other devices, if the status has changed. Aspects of the systems and methods can be implemented on computer-readable media as well as through data signals which convey information from and/or to the systems.

DETAILED DESCRIPTION OF THE EMBODIMENTS

Figure 1:
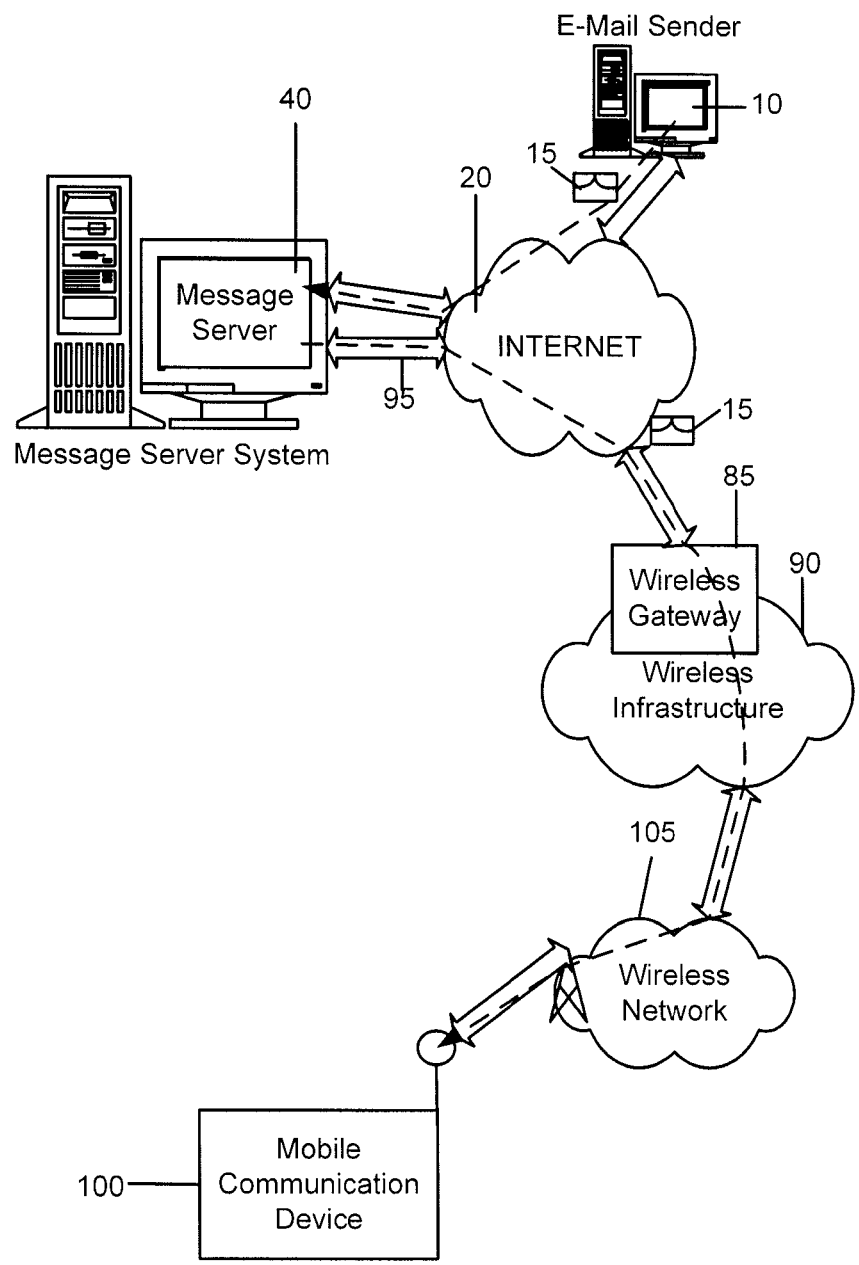
FIG. 1 is a block diagram illustrating an exemplary communication network in which a mobile wireless device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
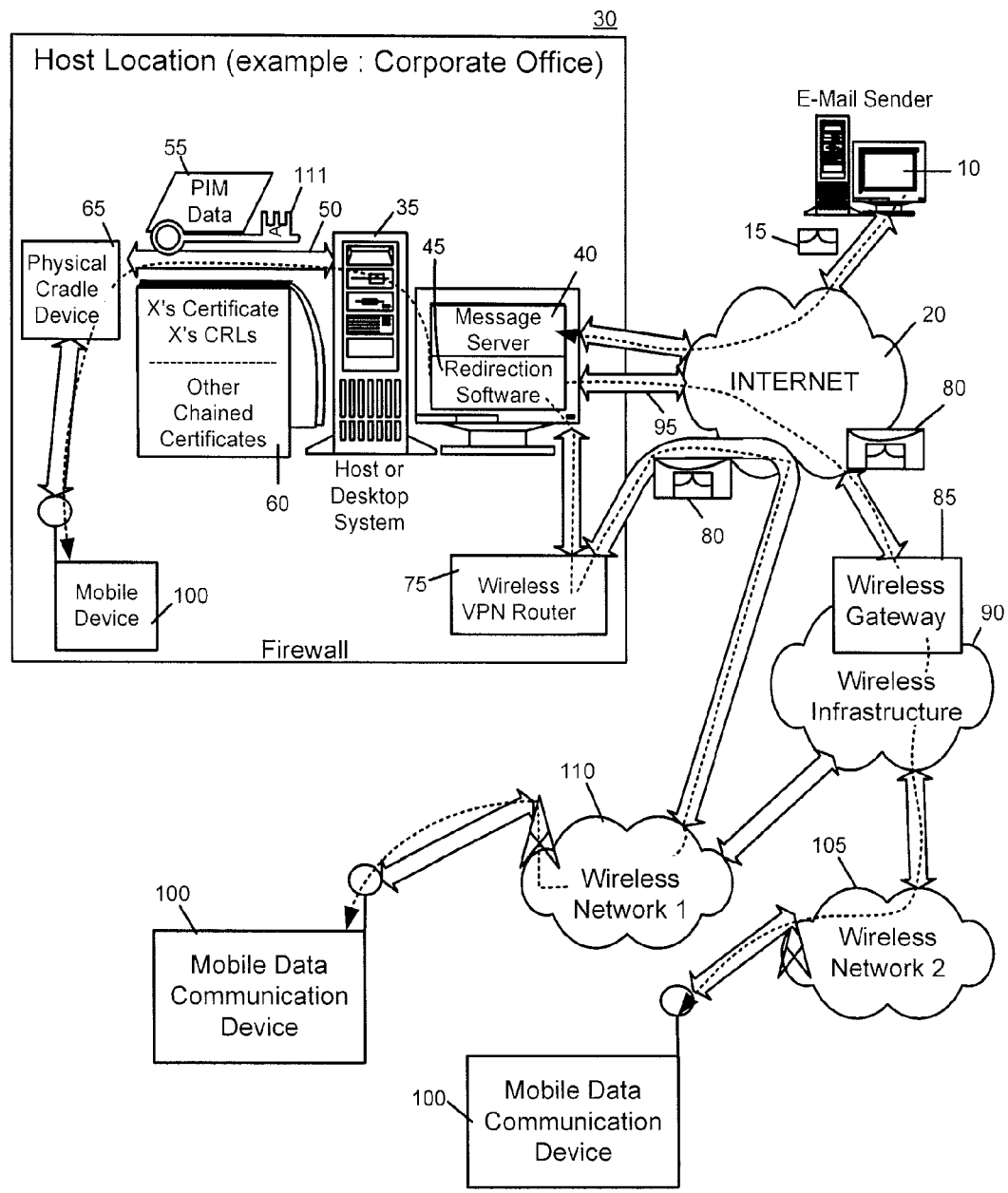
FIG. 2 is a block diagram illustrating alternative paths of providing information to a mobile wireless device.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
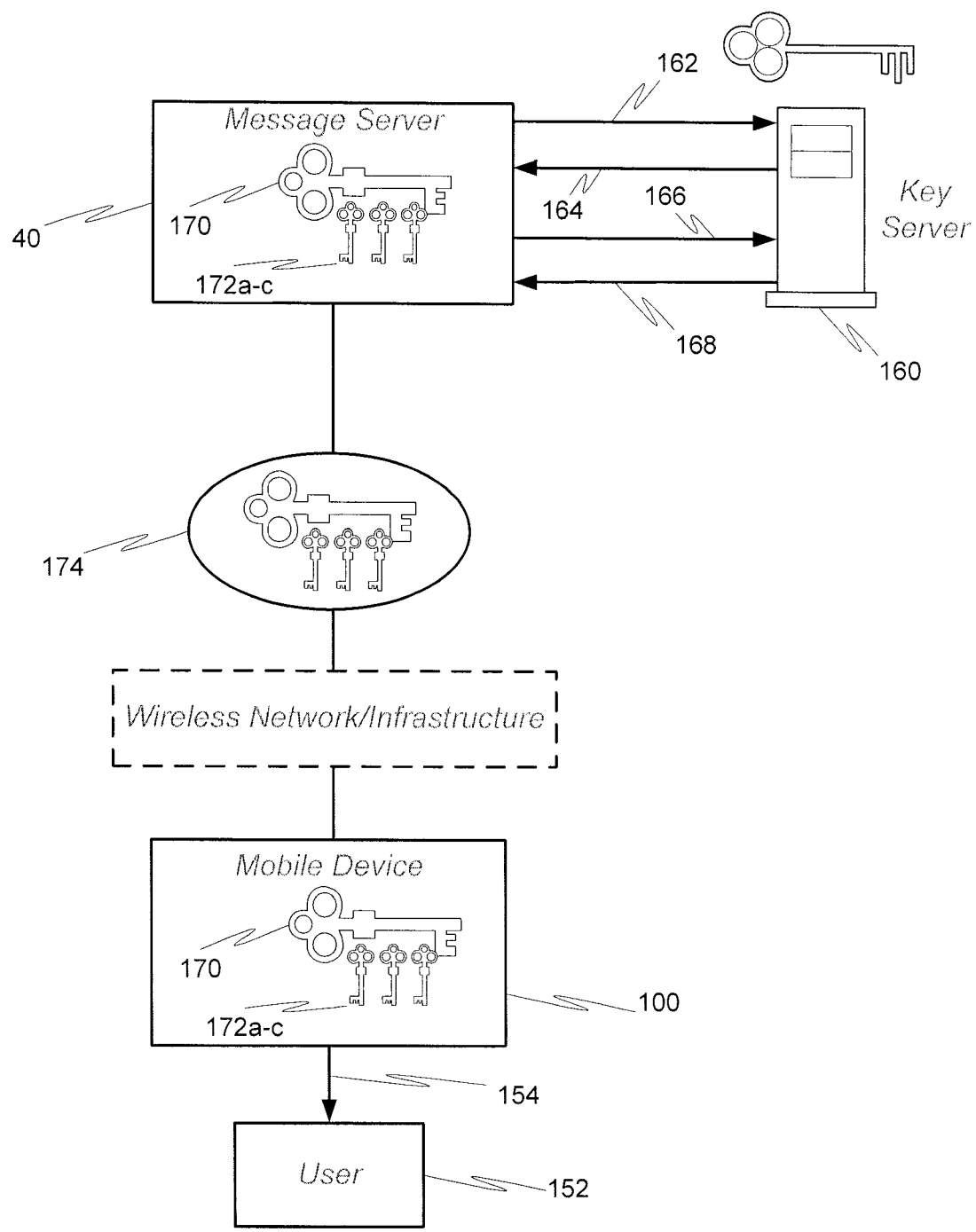
FIG. 3 is a block diagram illustrating the use of a message server to obtain certificate status of one or more subkeys.

FIG. 3 is a block diagram illustrating communications with a key server 160 in order to obtain certificate status of one or more subkeys for a given certificate. The message server 40 can be configured to automatically determine the time when to verify the status of subkeys (172a, 172b, 172c). The subkeys (172a, 172b, 172c) are associated with a key 170 the server has previously downloaded. The mobile wireless device 100 has a copy of this key 170 with the subkeys (172a, 172b, 172c), in order to be able to read and send messages using a "web of trust" security type system, such as PGP.

The message server 40 sends a status request 162 for the key 170 to the key server 160. The key server 160 sends response 164 back to the message server 40, which contains the information on whether the key 170 has been revoked by its user. If it has been revoked, then the message server 40 notifies the wireless mobile device 100 about the revocation.

If the key 170 has not been revoked, then the message server 40 sends a request 166 for the key 170 with its subkeys to the key server 160. The key server 160 sends a response 168 with the current version of the key with its subkeys and signatures. Once the message server 40 receives the most recent version of the key, it compares it to the version that it had before. If the message server 40 detects a difference between the version of the key, it replaces the old version with the new version, and sends a message 174 to the mobile device 100 with the entire key. The mobile device 100 receives the message 174, and replaces its copy of the key with the new version. After the key is replaced on the mobile device 100, a notification 152 can be sent to the user of the mobile device 100. In the end, the subkey which has changed can be replaced on both devices without the user's involvement.

The message server 40 may be configured in many different ways, such as to send to the mobile device 100 only subkeys, which have changed, and not the entire key. The message server 40 can include a software component which could interpret the structure of the keys and identify which subkey(s) have changed. Sending only the changed subkeys, instead of the entire key (with the subkeys which did not change) can save bandwidth on the wireless link. The verification of the subkey status may be initiated by a user or automatically initiated according to a predefined schedule contained on the mobile device 100 or the message server 40. In some embodiments, the schedule may be periodic with a period, for example, of one day.

Figure 4:
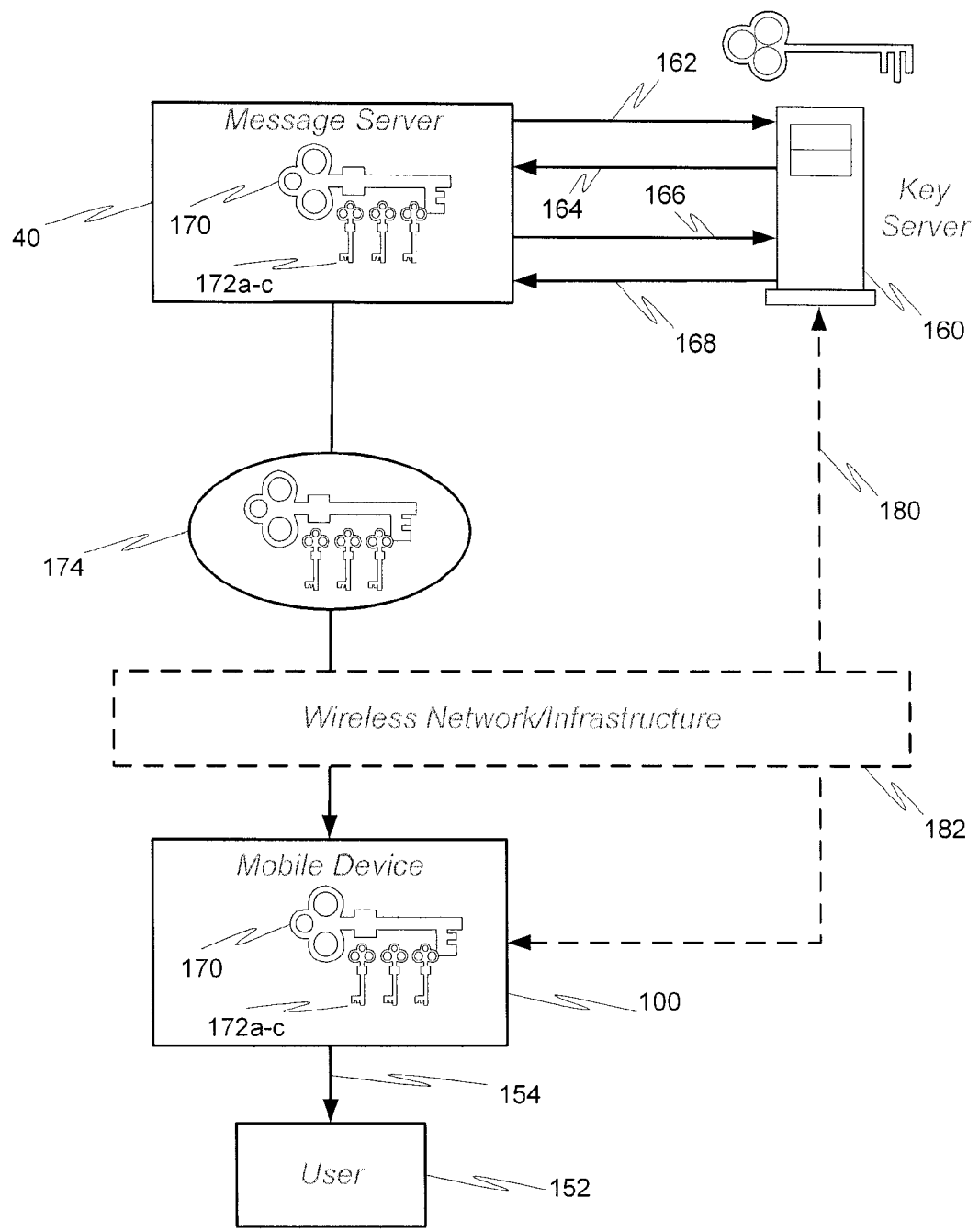
FIG. 4 is a block diagram illustrating communications between a mobile device and a key server in order to obtain certificate status of one or more subkeys.

FIG. 3 depicts the message server 40 communicating with a key server 160. However as shown at 180 in FIG. 4, the mobile device 100 can be configured to communicate with the key server 160 directly. The mobile device 100 may bypass the message server 40 to communicate directly with the key server 160, or may be configured to allow some of the communications to occur through the message server 40 with the remaining communications occurring through a direct connection 180 over a wireless network 182 with the key server 160.

Figure 5:
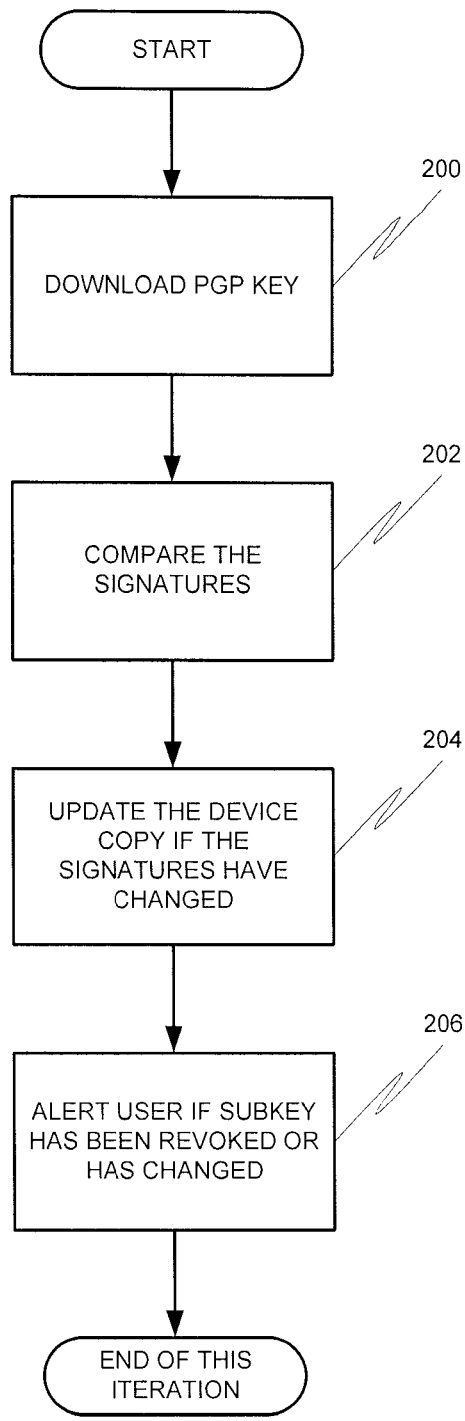
FIG. 5 is a flowchart illustrating steps involved in updating certificate status of subkeys.

FIG. 5 depicts an operational scenario for obtaining certificate status of a PGP subkey. In this operational scenario, it is possible in PGP to use different keys for encryption and authentication. Subkeys may be used for encryption and the main key may be used for authentication.

A user may create any number of subkeys for his main key. For example, if the main key is valid for three years, three subkey may be created to be valid for only one year each. This reduces the amount of ciphertext on the Internet encrypted with the same key (or subkey), thereby, reducing the opportunity for an attacker to determine the private key of the user. Keys and their subkeys are stored on the key server, where they are uploaded by owners and signers.

When keys and/or subkeys are used to encrypt and/or authenticate a message, the receiver of the message downloads the key for a sender of the message from the key server for authentication of the incoming messages from that user and for encryption of outgoing messages to that user. Once the receiver of the message determines, based on the signatures, that the main key used to sign the incoming message is authentic, he can be sure that the sender of the message is not an attacker. Also, when sending a message to another user, his subkey may be used for encryption. The subkey is a part of the receiver's main key, and its authenticity can be verified, based on signatures, before sending the message.

Once the key and subkeys have been acquired for the first time, they may change on the key server without a user knowing. A message server can make a request to verify the status for a given key using Lightweight Directory Access Protocol (LDAP). The key server sends a response notifying the message server whether the key is revoked or not. However, if the message server wishes to update the certificate status for subkeys of the main PGP key (whether user or program initiated), then code on the device downloads as indicated at step 200 the PGP key in which the subkey is contained. At step 202, the signatures of the downloaded subkey are compared to what is present on the device. At step 204, if the signatures have changed, then the device copy is updated to be consistent with the downloaded copy. If the subkey has been revoked (or has changed), then the user can be alerted at step 206.

The method of FIG. 5 can be utilized on an e-mail server that handles messages for the mobile device, or the method can be performed on the mobile device, or the different steps can be distributed across both the server and the mobile device depending upon the situation at hand.

The verification approach of the example operational scenario seamlessly determines for the user the status of the subkey for the user. It is noted that because of the significant differences between PGP and S/MIME, such as PGP's use of a web of trust model, a mobile device can utilize the methods and systems disclosed herein to fetch the certificate status of PGP subkeys.

The systems and methods disclosed herein are presented only by way of example and are not meant to limit the scope of the invention. Other variations of the systems and methods described above will be apparent to those skilled in the art and as such are considered to be within the scope of the invention which is defined by claims. For example, it should be understood that the steps and the order of the steps in the flowchart described herein may be altered, modified and/or augmented and still achieve the desired outcome.

As another example, the disclosed verification processing approaches could be extended in many ways, such as fetching the status of the main PGP key. When a signature is being updated, conflicts could arise because the owner of the key may have revoked the key, but the user's signature may disagree with that. The user is then prompted to determine what course of action to take. Alternatively, the code could automatically choose the appropriate path (either based on security or based on keeping the status quo with respect to the key) and decide whether to accept the revocation or not.

Figure 6:
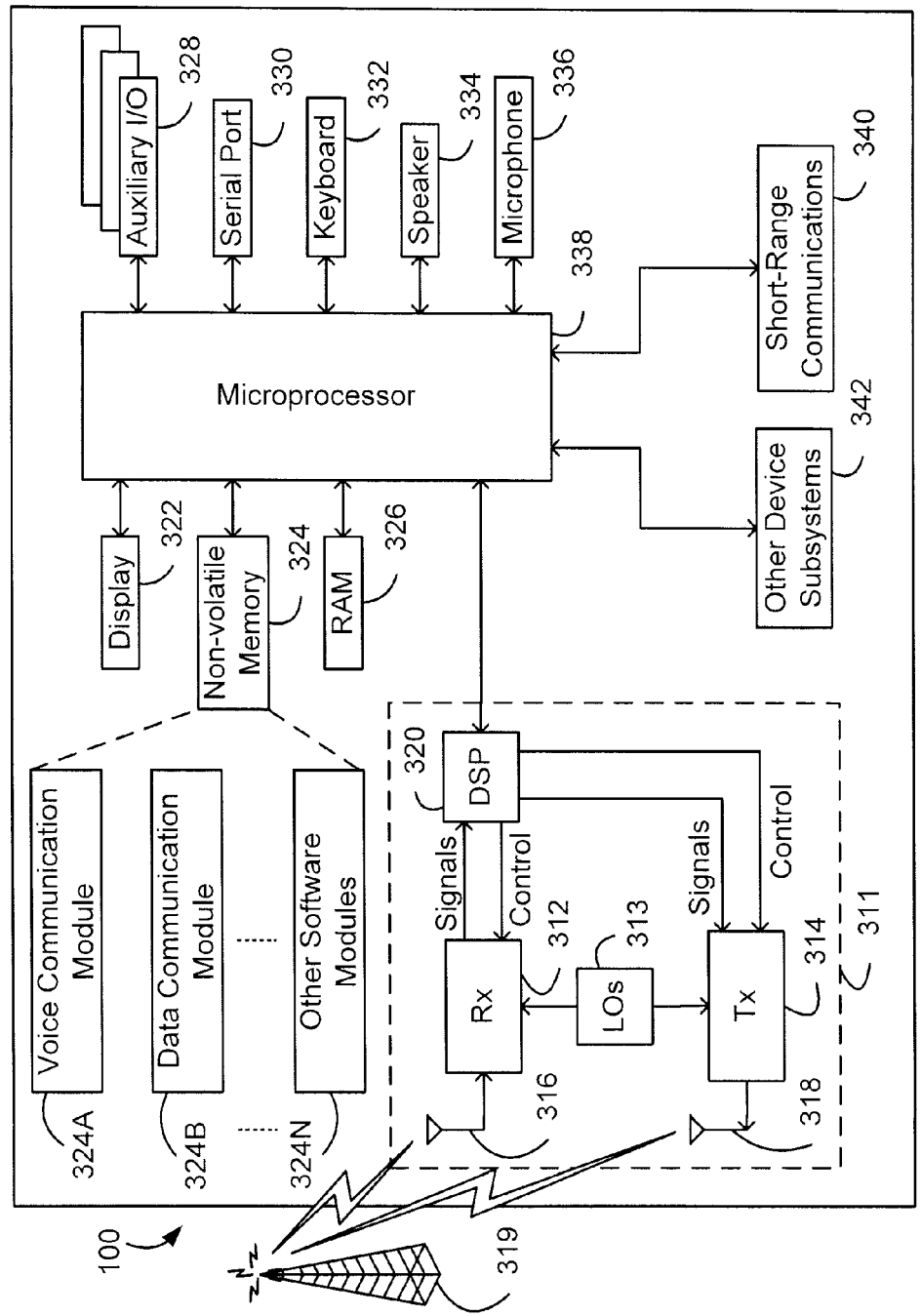
FIG. 6 is a block diagram illustrating an exemplary implementation of a mobile wireless device.

Still further, the systems and methods disclosed herein may be used with many different computers and devices, such as a wireless mobile communications device shown in FIG. 6. With reference to FIG. 6, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 6 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319.

The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 6 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

The invention claimed is:

1. A method of updating a subkey in a web of trust security environment, comprising:
    determining whether a main key that is used within the web of trust security environment is not revoked;
    acquiring a current version of the main key from a key server if the main key is not revoked;
    updating the main key on a message server if one or more signatures of one or more subkeys is different in the acquired current version of the main key from the main key stored on the message server;
    wherein the one or more subkeys are associated with the main key on the message server for handling encryption of data within the web of trust security environment; and
    issuing a notification if the acquired main key from the key server is updated.

2. The method of claim 1, wherein the web of trust security environment does not include a centralized authority to store a current status of security-related keys; wherein key revocation information is not automatically distributed by the key server; and wherein the web of trust security environment allows users to determine whether a key is authentic depending on a combination of entities which signed a given key.

3. The method of claim 2, wherein the main key and the one or more subkeys on the message server are used within a Pretty Good Privacy security environment; wherein the one or more subkeys are used for encryption and are digitally signed by any user within the web of trust security environment.

4. The method of claim 1, wherein determination of whether to update the main key on the message server is performed according to a predetermined schedule.

5. The method of claim 1, wherein determination of whether to update the main key on the message server is performed due to a user-initiated action.

6. The method of claim 1, wherein the updating further comprises sending a newly acquired key to a remote device.

7. The method of claim 6, wherein the remote device is a wireless mobile communication device.

8. The method of claim 7, wherein the updating further comprises sending to the wireless mobile communication device only subkeys whose set of signatures has changed.

9. The method of claim 8, wherein a user prompt on the wireless mobile communication device is provided when a conflict has arisen based upon an owner of the main key having revoked the main key; wherein the user prompt is provided for determining what course of action is to be taken with respect to the conflict.

10. The method of claim 8, wherein when a conflict has arisen based upon the owner of the main key having revoked the main key, computer instructions automatically determine what course of action is to be taken with respect to the conflict.

11. A non-transitory computer-readable storage medium capable of causing one or more microprocessors on a message server to update a subkey in a web of trust security environment, wherein the medium comprises instructions that configure the one or more microprocessors to:
    determine whether a main key that is used within the web of trust security environment is not revoked;
    acquire a current version of the main key from a key server if the main key is not revoked;
    update the main key on the message server if one or more signatures of one or more subkeys is different in the acquired current version of the main key from the main key stored on the message server;
    wherein the one or more subkeys are associated with the main key on the message server for handling encryption of data within the web of trust security environment; and
    issuing a notification if the acquired main key from the key server is updated.

12. A computing device programmed to update a subkey in a web of trust security environment, comprising:
    a microprocessor configured to determine whether a main key that is used within the web of trust security environment is not revoked;
    wherein the microprocessor is further configured to acquire a current version of the main key from a key server if the main key is not revoked;
    wherein the microprocessor is further configured to update the main key on the computing device if one or more signatures of one or more subkeys is different in the acquired current version of the main key from the main key stored on the computing device;

wherein the one or more subkeys are associated with the main key on the computing device for handling encryption of data within the web of trust security environment; and wherein the microprocessor is further configured to issue a notification if the acquired main key from the key server is updated.

13. The device of claim 12, wherein the computing device is a message server.

14. The device of claim 12, wherein the web of trust security environment does not include a centralized authority to store a current status of security-related keys; wherein key revocation information is not automatically distributed by the key server; and wherein the web of trust security environment allows users to determine whether a key is authentic depending on a combination of entities which signed a given key.

15. The device of claim 14, wherein the main key and the one or more subkeys on the computing device are used within a Pretty Good Privacy security environment; wherein the one or more subkeys are used for encryption and are digitally signed by any user within the web of trust security environment.

16. The device of claim 12, wherein determination of whether to update the main key on the computing device is performed by the microprocessor according to a predetermined schedule.

17. The device of claim 12, wherein determination of whether to update the main key on the computing device is performed by the microprocessor due to a user-initiated action.

18. The device of claim 12, wherein the microprocessor is further configured to send a newly acquired key to a remote device.

19. The device of claim 18, wherein the remote device is a wireless mobile communication device.

20. The device of claim 19, wherein the microprocessor is configured to send to the wireless mobile communication device only subkeys whose set of signatures has changed.

21. The device of claim 20, wherein a user prompt on the wireless mobile communication device is provided when a conflict has arisen based upon an owner of the main key having revoked the main key; wherein the user prompt is provided for determining what course of action is to be taken with respect to the conflict.

22. The device of claim 20, wherein when a conflict has arisen based upon the owner of the main key having revoked the main key computer instructions automatically determine what course of action is to be taken with respect to the conflict.

* * * * *